E. G. GOODWIN.
MOWER.
APPLICATION FILED JAN. 8, 1909.
932,697.
Patented Aug. 31, 1909.
2 SHEETS—SHEET 1.
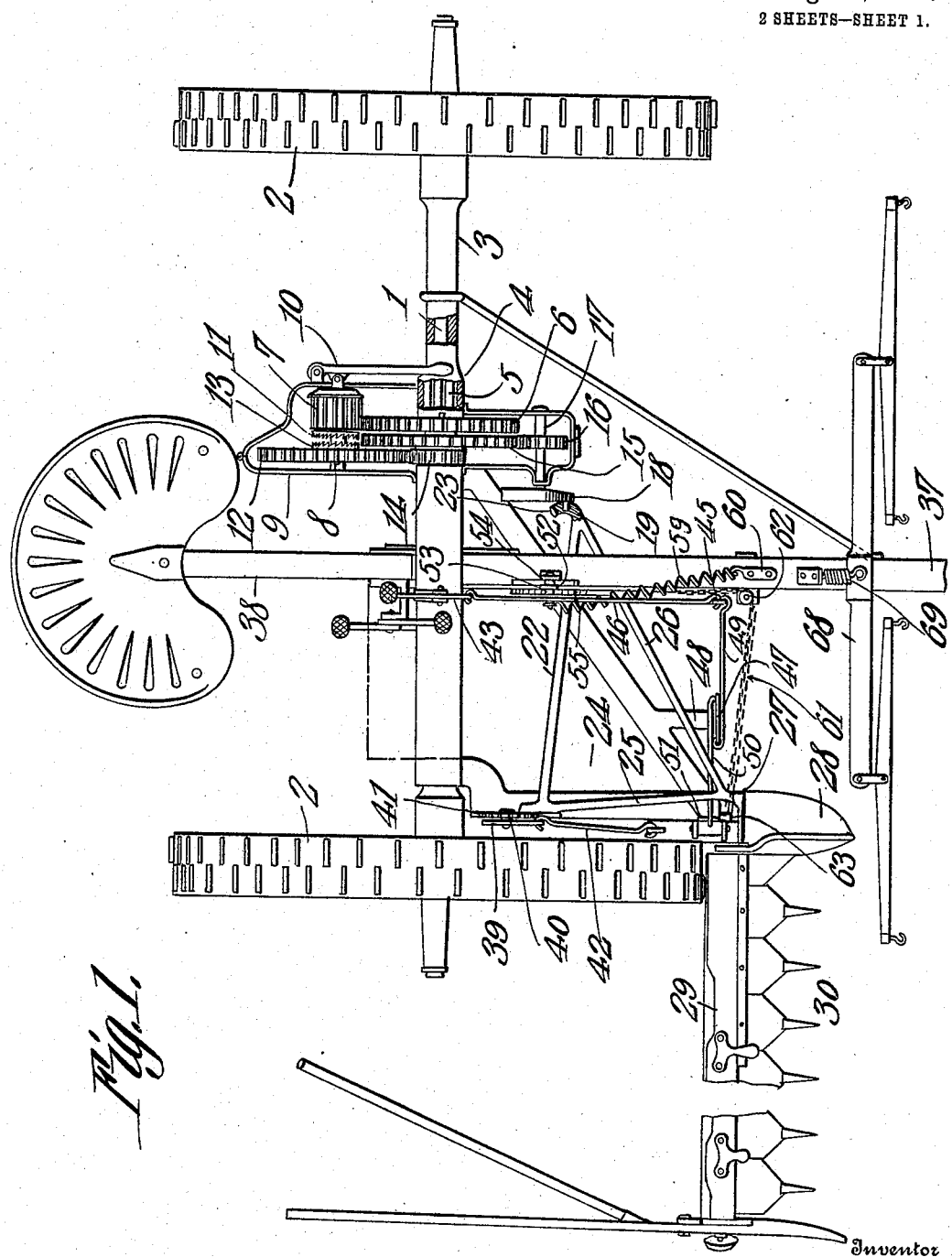
Witnesses
Inventor
Ernest G. Goodwin.
By C. A. Snow & Co.
Attorneys E. G. GOODWIN.
MOWER.
APPLICATION FILED JAN. 8, 1909.
932,697.
Patented Aug. 31, 1909.
2 SHEETS—SHEET 2.
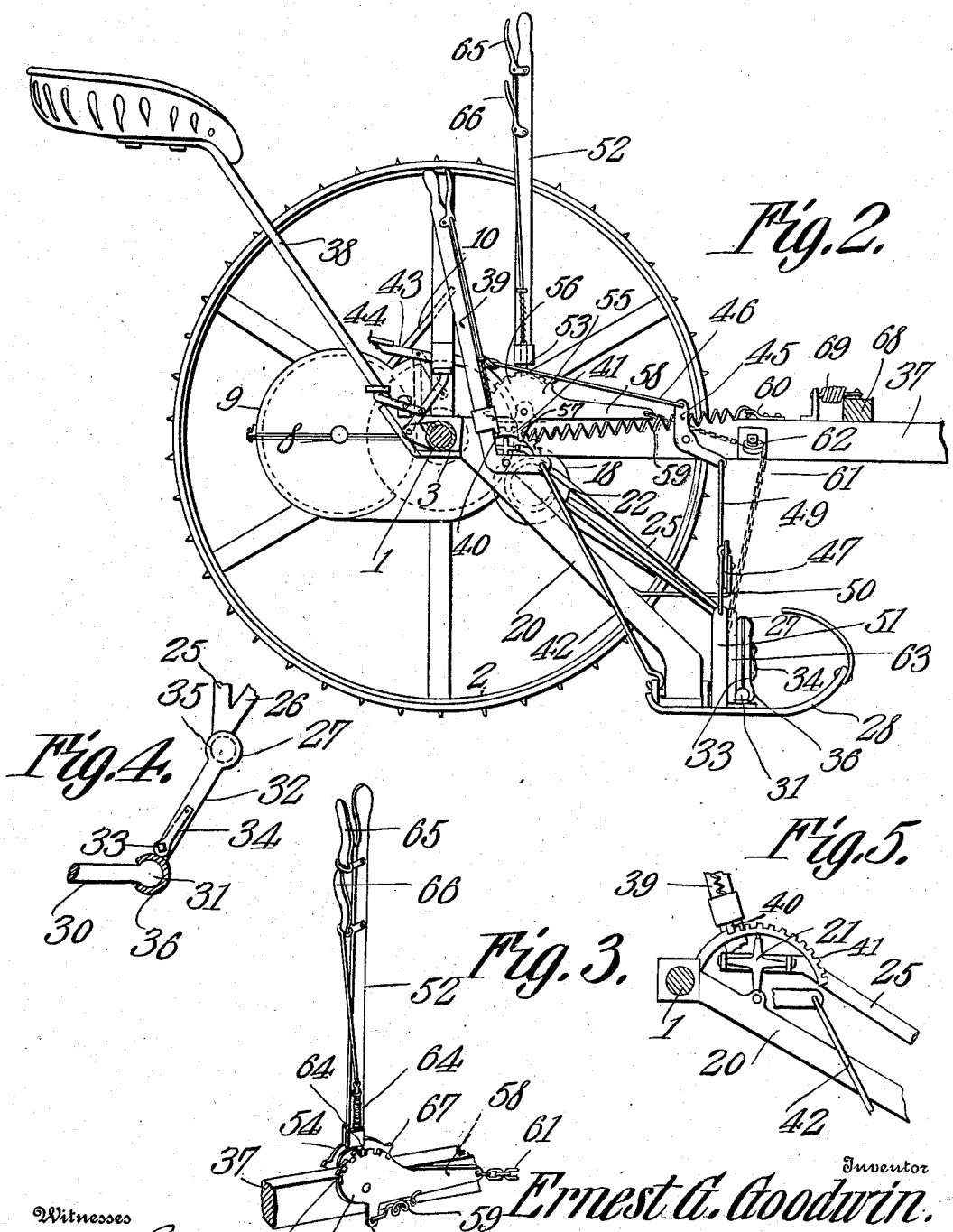
Witnesses
E. J. Stewart
E. Daniels
Inventor
Ernest G. Goodwin.
By C. A. Snow & Co.
Attorneys

UNITED STATES PATENT OFFICE.

ERNEST G. GOODWIN, OF BYBEE, VIRGINIA.

MOWER.

932,697.  Specification of Letters Patent.  Patented Aug. 31, 1909.

Application filed January 8, 1909. Serial No. 471,357.

*To all whom it may concern:*

Be it known that I, ERNEST G. GOODWIN, a citizen of the United States, residing at Bybee, in the county of Fluvanna and State of Virginia, have invented a new and useful Mower, of which the following is a specification.

This invention has relation to mowers and it consists in the novel construction and arrangement of its parts, as hereinafter shown and described.

The object of the invention is to provide a mower with a sickle driving mechanism in which a vibrating arm is employed in the train of apparatus which transmits motion from the ground wheels to the sickle. The arm as used in the present construction is so arranged as not to interfere with the usual and free movement of the sickle-bar and its attachments, and, at the same time, it is so arranged as to effectually operate the sickle when its supporting bar is in operating position without undue friction or tendency to side draft on the part of the implement.

The mower is especially adapted to be used upon rough land, and either end portion of the cutter bar and sickle bar may be swung vertically when the other end portions of the said bars may remain sufficiently near the ground to perform operation. The said bars may also be swung into vertical positions without disconnecting any of the parts and an adjustable lever mechanism is provided by means of which the parts may be conveniently swung as indicated.

In the accompanying drawings: Figure 1 is a top plan view of the mower with parts broken away: Fig. 2 is a longitudinal sectional view of the same: Fig. 3 is a perspective view of a lever mechanism used upon the mower: Fig. 4 is a perspective view, partly in section, of the means for connecting the arm referred to with the sickle-bar. Fig. 5 is a detail view of a joist used in the mower.

The mower consists of an axle shaft 1, upon which is mounted the traction wheels 2. The intermediate portion of the axle 1 is surrounded by the sleeve 3. The sleeve is provided, at intervals, with the enlarged portions 4, in which are located the rollers 5 which form bearings for the sleeve 3 upon the axle shaft 1. A gear-wheel 6 is keyed or otherwise fixed to the axle-shaft 1, and meshes with the gear wheel 7 which is loosely journaled upon a shaft 8, supported in the casing 9, which, in turn, is supported by the sleeve 3. The lever mechanism 10 is mounted upon the casing 9 and is operatively connected with the gear wheel 7 whereby the said gear wheel may be moved longitudinally along the shaft 8. The gear wheel 7 is provided at one end with the clutch member 11. The gear wheel 12 is keyed upon the shaft 8 and is provided with a clutch hub 13, which is adapted to be engaged by the clutch member 11 carried by the gear wheel 7. The gear wheel 12 meshes with the gear wheel 14 which is loosely journaled upon the axle shaft 1. The said gear wheel 14 is attached to, or is an integral part of, the gear wheel 15. Said gear wheels 14 and 15 are concentrically arranged. The gear wheel 15 meshes with the gear wheel 16 which is fixed to the shaft 17, which in turn is journaled for rotation in the forward portion of the casing 9. One end of the shaft 17 projects through the side of the casing 9, and the disk 18 is mounted upon the projecting end of the said shaft 17. The wrist-pin 19 is mounted upon the face of the disk 18 and the opposite side of the disk 18 from that upon which the said wrist-pin 19 is mounted, is thicker or heavier than the side thereof which carries the said wrist-pin, in order that the said disk may be properly balanced upon the shaft 17.

The frame 20 is attached to the sleeve 3 and is located between the traction wheels 2. The triangular arm 22 is provided at one end with a bearing portion 23 which receives the wrist-pin 19. The arm 22 is pivoted at the end of the side thereof opposite to which the bearing 23 is mounted to the cruciform arm 21 which in turn is pivoted upon the frame 20. The arm 22 is provided with forwardly disposed sides 25 and 26 which merge together at their forward ends and are provided with the ball 27. The shoe 28 is attached to the forward portion of the frame 20 and the cutter-bar 29 is pivotally connected with the said shoe 28 in the usual manner. The sickle-bar 30 is arranged to reciprocate along the cutter bar and is provided at its inner end with a globular enlargement 31. The enlargement 31 is connected with the ball 27 carried by the arms 25 and 26 by a link which is made up of the side sections 32, which are bolted together as at 33, (see Fig. 2). One of the said sections 32 is provided with a spring 34, which is adapted to engage the cap mounted upon the bolt 33 and prevent the same from unscrewing from the said bolt. The upper end portions of the sections 32 are formed into the sockets 35, which receive the ball 27. The lower portions of the said sections are formed into the socket 36, which receives the globular enlargement 31 and the end of the sickle bar 30. The said enlargement 31, together with the socket 36, forms a universal joint.

The rear end of the tongue 37 is connected with the sleeve 3, and the operator's seat 38 is mounted upon the rear end portion of the said tongue. The lever 39 is fulcrumed upon the frame 20, and is provided with a pawl 40 which engages the gear segment 41 also mounted upon the said frame 20. The lower end portion of the lever 39 is connected by means of the link 42 with the rear end of the shoe 28, and, through the instrumentality of the said lever and its connections, the said shoe 28 may be swung or tilted longitudinally. The lever 43 is fulcrumed upon the sleeve 3 and is provided at its rear end with a foot-rest 44. The rocker 45 is pivotally attached to the side of the tongue 37 and the rod 46 is pivotally connected at its forward end with one end of the rocker 45, and at its rear end is pivotally connected with the lever 43. The rocker 47 is pivotally mounted upon an extension 48 of the frame 20, and the rod 49 is pivotally connected at one end with one end of the rocker 45 and at its other end with one end of the rocker 47. The rod 50 pivotally connects the other end of the rocker 47 with the standard 51 which is erected upon the shoe 28. Through the instrumentality of the foot lever 44 and its connections, the cutter-bar may be swung vertically at its outer end upon its hinge connection with the frame 20.

The lever 52 is fulcrumed to the tongue 37 and is provided upon one side with a pawl 53 which is adapted to operate upon the segment 54 which is located at one side of the said lever 52. The segment 55 is pivotally attached to the opposite side of the tongue 37 from that upon which the segment 54 is mounted. The said segment 55 is provided with a series of gear teeth 56, and is also provided with a depending lug 57 and a laterally disposed lug 58. The spring 59 is connected at one end with the lug 57 and at its forward end with the hook 60 mounted upon the tongue 37. The said spring 59 is under tension with a tendency to draw the lug 57 toward the hook 60. One end of a chain 61 or other tension means is attached to the end of the lug 58, the intermediate portion of the said chain 61 passes around a pulley-wheel 62 which is attached to the side of the tongue 37, and the other end of the said chain 61 is attached to the standard 63, which is also erected upon the shoe 27. The pawl 64 is mounted upon the lever 52 and is adapted to engage the teeth 56 of the segment 55. The pawls 53 and 64 are connected with the handle grips 65 and 66 respectively by the usual rod connections, and it will be seen that, by disengaging the pawl 53 from either of the teeth 67 which are mounted upon the segment 54, and by permitting the pawl 64 to remain in engagement with any one of the teeth 65, that the disk 55 may be swung upon its pivot, which, in turn, will move the chain 61 longitudinally, and thereby afford means for swinging the cutter bar 29 upon its pivotal connection with the frame 20. Thus, when the lever 52 is swung while the said pawl 53 is disengaged from the teeth of the segment 54, the said cutter-bar 29 may be swung or adjusted to a major extent, while, by disengaging the pawl 64 from the teeth 56 of the segment 55, the said cutter-bar 29 may be given minor adjustment in a similar manner. That is to say that the lever 52 may be so positioned with relation to the lug 58 that by swinging the lever 52 the cutter bar 29 may be moved to a desired position.

The double-tree 68 lies transversely across the tongue 37 and is connected therewith by means of the spring 69, the forward end of which is attached to the said double-tree, and the rear end of which is connected with the said tongue. Thus a resilient means is interposed between the tongue and the tree, which will relieve the draft animals of the jar and strain during the operation of the mower.

Having described my invention, what I claim as new, and desire to secure, by Letters Patent, is:—

In a mowing machine, the combination with a main frame, and cutting apparatus having jointed connection therewith, a lifting mechanism mounted upon the main frame and connected with the cutting apparatus and consisting of a lever fulcrumed to the frame, means for holding the lever in adjusted position with relation to the frame, a movable segment connected with the cutting apparatus and operated by the lever, and means for holding said segment in a fixed adjusted position with relation to the lever.

In testimony that I claim the foregoing as my own, I have hereto affixed my signature in the presence of two witnesses.

ERNEST G. GOODWIN.

Witnesses:
Wm. Sclater,
M. H. Parrish.